(12) United States Patent
Dua et al.

(10) Patent No.: US 9,178,562 B2
(45) Date of Patent: Nov. 3, 2015

(54) METHOD AND APPARATUS TO DYNAMICALLY SELECT UE PROCESSING CAPABILITIES BASED ON CHANNEL IMPULSE RESPONSE ESTIMATES

(71) Applicant: QUALCOMM Incorporated, San Diego, CA (US)

(72) Inventors: Aditya Dua, Santa Clara, CA (US); Lei Xiao, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/797,392

(22) Filed: Mar. 12, 2013

(65) Prior Publication Data

US 2014/0016677 A1 Jan. 16, 2014

Related U.S. Application Data

(60) Provisional application No. 61/672,106, filed on Jul. 16, 2012.

(51) Int. Cl.
*H04B 1/00* (2006.01)
*H04B 1/7115* (2011.01)
(Continued)

(52) U.S. Cl.
CPC .......... *H04B 1/7115* (2013.01); *H04L 25/0216* (2013.01); *H04L 25/03019* (2013.01); *H04L 2025/0377* (2013.01); *H04L 2025/03547* (2013.01)

(58) Field of Classification Search
CPC .............. H04L 25/0212; H04L 5/0007; H04L 25/0216; H04L 27/2647; H04L 25/0204; H04L 5/0023; H04L 1/0606; H04L 2025/03726; H04L 25/025; H04L 25/03292; H04L 27/01; H04L 1/0036; H04L 1/0631; H04L 25/03
USPC ................... 375/148, 260, 272, 285, 343, 367
See application file for complete search history.

(56) References Cited

U.S. PATENT DOCUMENTS 6,370,397 B1 * 4/2002 Popovic et al. ................ 455/561
8,204,151 B2 6/2012 Kim et al.
(Continued)

FOREIGN PATENT DOCUMENTS

GB WO 02/078205 * 10/2002 ............. H04B 1/707

OTHER PUBLICATIONS

International Search Report and Written Opinion—PCT/US2013/049331—ISA/EPO—Sep. 13, 2013.
(Continued)

*Primary Examiner* — Dhaval Patel
(74) *Attorney, Agent, or Firm* — Charles Chesney

(57) ABSTRACT

A method, an apparatus, and a computer program product for wireless communication are provided in connection with dynamic selection of a UE receiver. In one example, a communications device is equipped to obtain one or more channel impulse response (CIR) estimates, generate a delay spread metric value that characterizes a multipath delay spread of a channel based on the obtained one or more CIR estimates, and select a receiver option with a first power consumption value, for use by the UE, from a plurality receiver options with different optimal power consumption values, based on the generated delay spread metric value. In an aspect, a comparatively more complex receiver option may be selected when the channel is rich in multipath. In another aspect, a comparatively less complex receiver option may be selected when the channel exhibits flat fading.

42 Claims, 8 Drawing Sheets

(51) Int. Cl.
*H04L 25/02* (2006.01)
*H04L 25/03* (2006.01)

(56) References Cited

U.S. PATENT DOCUMENTS

| | | | | |
|---|---|---|---|---|
| 8,385,222 | B2 * | 2/2013 | Lindoff et al. | 370/252 |
| 8,576,933 | B2 * | 11/2013 | Mehrabani | 375/260 |
| 8,638,867 | B2 * | 1/2014 | Roman et al. | 375/260 |
| 2002/0051436 | A1 * | 5/2002 | Ertel et al. | 370/335 |
| 2003/0058962 | A1 | 3/2003 | Baldwin | |
| 2005/0008092 | A1 * | 1/2005 | Kadous | 375/267 |
| 2006/0029164 | A1 | 2/2006 | Hwang | |
| 2008/0310485 | A1 | 12/2008 | Soliman et al. | |
| 2009/0110049 | A1 | 4/2009 | Luschi et al. | |
| 2009/0131123 | A1 | 5/2009 | Coersmeier et al. | |
| 2009/0323843 | A1 | 12/2009 | Yang et al. | |
| 2010/0157833 | A1 * | 6/2010 | Vrcelj et al. | 370/252 |
| 2011/0032837 | A1 | 2/2011 | Luschi et al. | |
| 2011/0074634 | A1 * | 3/2011 | Yeo et al. | 342/458 |
| 2011/0129027 | A1 | 6/2011 | Takaoka et al. | |
| 2012/0281551 | A1 * | 11/2012 | Alanara | 370/252 |
| 2012/0314750 | A1 * | 12/2012 | Mehrabani | 375/229 |

OTHER PUBLICATIONS

Taiwan Search Report—TW102124229—TIPO—Mar. 6, 2015.

* cited by examiner

METHOD AND APPARATUS TO DYNAMICALLY SELECT UE PROCESSING CAPABILITIES BASED ON CHANNEL IMPULSE RESPONSE ESTIMATES

CLAIM OF PRIORITY UNDER 35 U.S.C. §119

The present application for Patent claims priority to Provisional Application No. 61/672,106 entitled "METHOD AND APPARATUS TO DYNAMICALLY SELECT UE PROCESSING CAPABILITIES BASED ON CHANNEL IMPULSE RESPONSE ESTIMATES" filed Jul. 16, 2012, and assigned to the assignee hereof and hereby expressly incorporated by reference herein.

BACKGROUND

1. Field

Aspects of the present disclosure relate generally to wireless communication systems, and more particularly, to dynamic selection of a user equipment (UE) receiver from multiple receiver options with different processing capabilities based on channel impulse response estimates.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

High Speed Downlink Packet Access (HSDPA) is a 3G packet based data service offered on the downlink of wideband CDMA (WCDMA) networks. HSDPA was first standardized in the Release 5 specifications of 3GPP and continues to evolve as the premier technology for providing broadband wireless access to users in over 100 countries.

A RAKE receiver may commonly be used by WCDMA/HSDPA user equipment (UEs) in order to collect signal energy from various multipaths and improve modem performance. However, more sophisticated receiver architectures (e.g. chip equalizer, interference suppression or type 3i equalizer, interference canceller) which may deliver superior performance compared to RAKE have become prominent in recent years. Minimum performance requirements for advanced receiver architectures have been specified in the 3GPP Specification and numerous commercially available WCDMA/HSDPA capable mobile devices support these architectures.

Advanced receivers may deliver superior performance, but it comes at the cost of increased modem power consumption. Indiscriminate use of power draining advanced receivers can drain a UE battery and leave the end user dissatisfied with his or her mobile device user experience.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with dynamic selection of a UE receiver. In one example, a communications device is equipped to obtain one or more channel impulse response (CIR) estimates, generate a delay spread metric value that characterizes a multipath delay spread of a channel based on the obtained one or more CIR estimates, and select a receiver option with a first power consumption value, for use by the UE, from a plurality receiver options with different optimal power consumption values, based on the generated delay spread metric value. In an aspect, a comparatively more complex receiver option may be selected when the channel is rich in multipath. In another aspect, a comparatively less complex receiver option may be selected when the channel exhibits flat fading.

According to related aspects, a method for dynamically selecting of a UE receiver is provided. The method can include obtaining, by a UE, one or more CIR estimates. Further, the method can include generating a delay spread metric value that characterizes a multipath delay spread of a channel based on the obtained one or more CIR estimates. Moreover, the method may include selecting a receiver option with a first power consumption value, for use by the UE, from a plurality receiver options with different optimal power consumption values, based on the generated delay spread metric value.

Another aspect relates to a communications apparatus enabled to dynamically select of a UE receiver. The communications apparatus can include means for obtaining, by a UE, one or more CIR estimates. Further, the communications apparatus can include means for generating a delay spread metric value that characterizes a multipath delay spread of a channel based on the obtained one or more CIR estimates. Moreover, the communications apparatus can include means for selecting a receiver option with a first power consumption value, for use by the UE, from a plurality receiver options with different optimal power consumption values, based on the generated delay spread metric value.

Another aspect relates to a communications apparatus. The apparatus can include a processing system configured to obtain one or more CIR estimates. Further, the processing system may be configured to generate a delay spread metric value that characterizes a multipath delay spread of a channel based on the obtained one or more CIR estimates. Moreover, the processing system may further be configured to select a receiver option with a first power consumption value, for use by the UE, from a plurality receiver options with different optimal power consumption values, based on the generated delay spread metric value.

Still another aspect relates to a computer program product, which can have a computer-readable medium including code for obtaining, by a UE, one or more CIR estimates. Further, the computer-readable medium may include code for generating a delay spread metric value that characterizes a multi-path delay spread of a channel based on the obtained one or more CIR estimates. Moreover, the computer-readable medium can include code for selecting a receiver option with a first power consumption value, for use by the UE, from a plurality receiver options with different optimal power consumption values, based on the generated delay spread metric value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
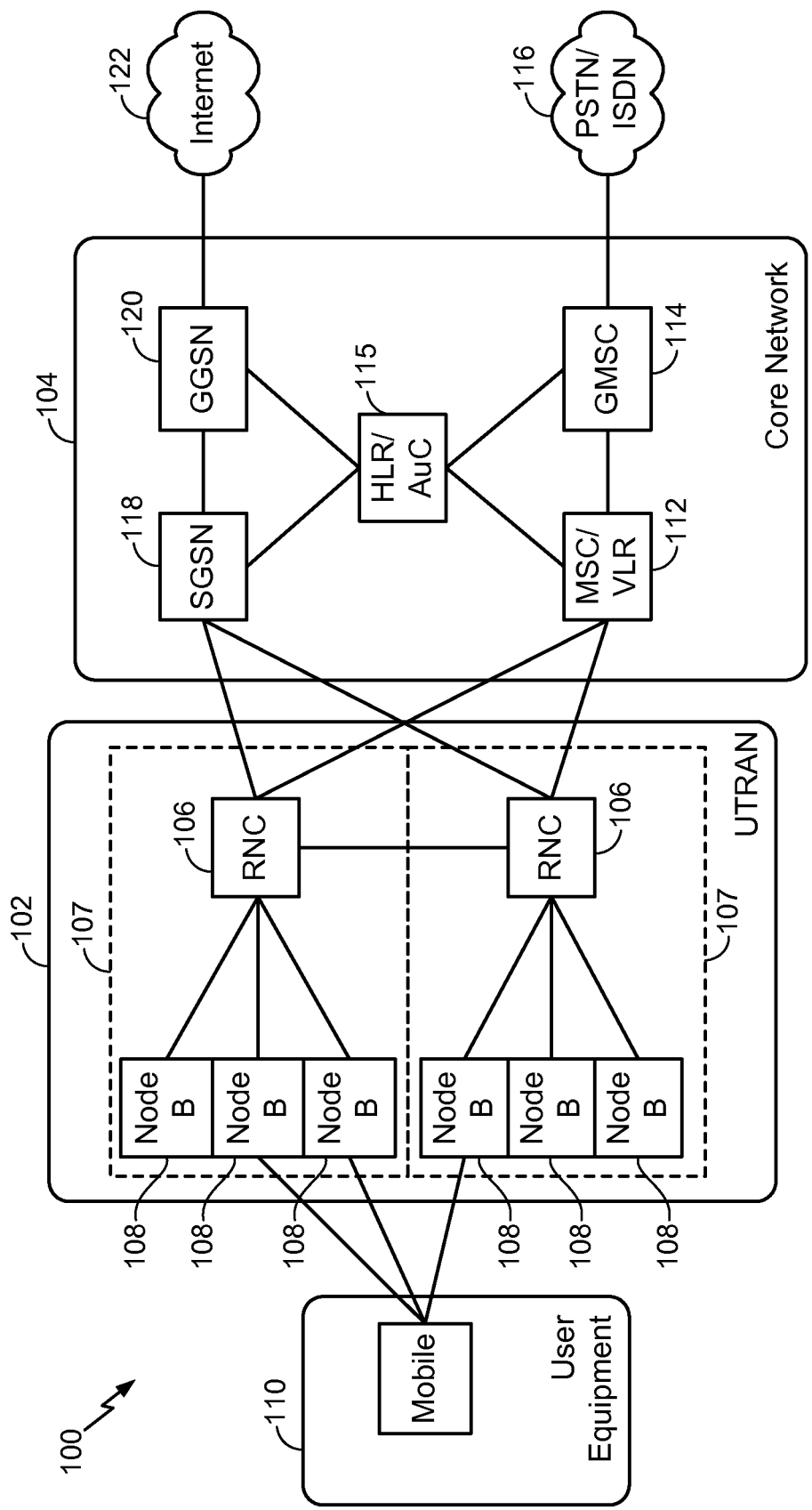
FIG. 1 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system 100 employing a W-CDMA air interface. A UMTS network includes three interacting domains: a Core Network (CN) 104, a UMTS Terrestrial Radio Access Network (UTRAN) 102, and User Equipment (UE) 110. In this example, the UTRAN 102 provides various wireless services including telephony, video, data, messaging, broadcasts, and/or other services. The UTRAN 102 may include a plurality of Radio Network Subsystems (RNSs) such as an RNS 107, each controlled by a respective Radio Network Controller (RNC) such as an RNC 106. Here, the UTRAN 102 may include any number of RNCs 106 and RNSs 107 in addition to the RNCs 106 and RNSs 107 illustrated herein. The RNC 106 is an apparatus responsible for, among other things, assigning, reconfiguring and releasing radio resources within the RNS 107. The RNC 106 may be interconnected to other RNCs (not shown) in the UTRAN 102 through various types of interfaces such as a direct physical connection, a virtual network, or the like, using any suitable transport network.

Communication between a UE 110 and a Node B 108 may be considered as including a physical (PHY) layer and a medium access control (MAC) layer. Further, communication between a UE 110 and an RNC 106 by way of a respective Node B 108 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 108 are shown in each RNS 107; however, the RNSs 107 may include any number of wireless Node Bs. The Node Bs 108 provide wireless access points to a CN 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. For illustrative purposes, one UE 110 is shown in communication with a number of the Node Bs 108. The DL, also called the forward link, refers to the communication link from a Node B 108 to a UE 110, and the UL, also called the reverse link, refers to the communication link from a UE 110 to a Node B 108.

The CN 104 interfaces with one or more access networks, such as the UTRAN 102. As shown, the CN 104 is a GSM core network. However, as those skilled in the art will recognize, the various concepts presented throughout this disclosure may be implemented in a RAN, or other suitable access network, to provide UEs with access to types of CNs other than GSM networks.

The CN 104 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 104 supports circuit-switched services with a MSC 112 and a GMSC 114. In some applications, the GMSC 114 may be referred to as a media gateway (MGW). One or more RNCs, such as the RNC 106, may be connected to the MSC 112. The MSC 112 is an apparatus that controls call setup, call routing, and UE mobility functions. The MSC 112 also includes a VLR that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) 115 containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR 115 to determine the UE's location and forwards the call to the particular MSC serving that location.

The CN 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard circuit-switched data services. The GGSN 120 provides a connection for the UTRAN 102 to a packet-based network 122. The packet-based network 122 may be the Internet, a private data network, or some other suitable packet-based network. The primary function of the GGSN 120 is to provide the UEs 110 with packet-based network connectivity. Data packets may be transferred between the GGSN 120 and the UEs 110 through the SGSN 118, which performs primarily the same functions in the packet-based domain as the MSC 112 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 108 and a UE 110. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 110 provides feedback to the node B 108 over the HS-DPCCH to indicate whether it correctly decoded a packet on the downlink.

HS-DPCCH further includes feedback signaling from the UE 110 to assist the node B 108 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 108 and/or the UE 110 may have multiple antennas supporting MIMO technology. The use of MIMO technology enables the node B 108 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 110 to increase the data rate or to multiple UEs 110 to increase the overall system capacity. This is achieved by spatially precoding each data stream and then transmitting each spatially precoded stream through a different transmit antenna on the downlink. The spatially precoded data streams arrive at the UE(s) 110 with different spatial signatures, which enables each of the UE(s) 110 to recover the one or more the data streams destined for that UE 110. On the uplink, each UE 110 may transmit one or more spatially precoded data streams, which enables the node B 108 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 2:
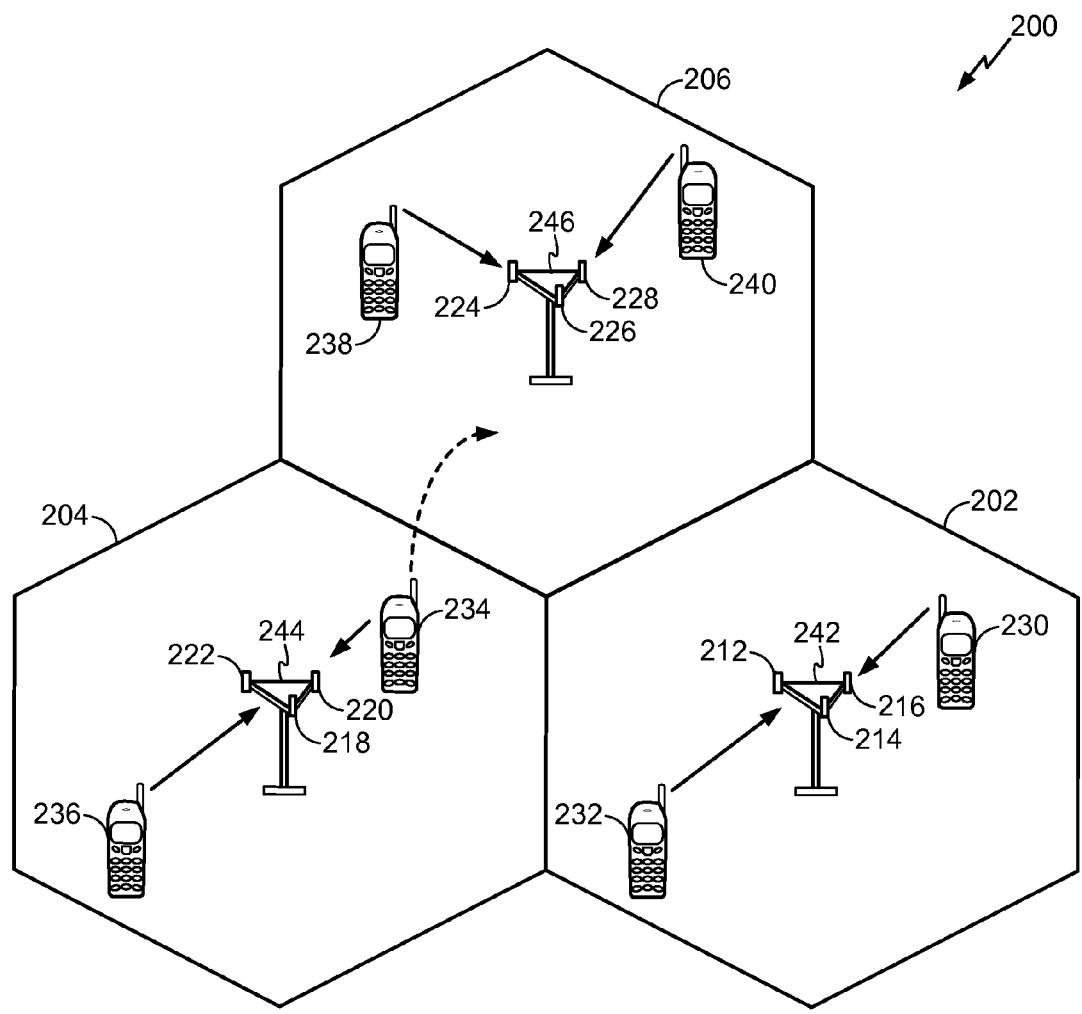
FIG. 2 is a conceptual diagram illustrating an example of an access network.

Referring to FIG. 2, an access network 200 in a UTRAN architecture is illustrated. The multiple access wireless communication system includes multiple cellular regions (cells), including cells 202, 204, and 206, each of which may include one or more sectors. The multiple sectors can be formed by groups of antennas with each antenna responsible for communication with UEs in a portion of the cell. For example, in cell 202, antenna groups 212, 214, and 216 may each correspond to a different sector. In cell 204, antenna groups 218, 220, and 222 each correspond to a different sector. In cell 206, antenna groups 224, 226, and 228 each correspond to a different sector. The cells 202, 204 and 206 may include several wireless communication devices, e.g., User Equipment or UEs, which may be in communication with one or more sectors of each cell 202, 204 or 206. For example, UEs 230 and 232 may be in communication with Node B 242, UEs 234 and 236 may be in communication with Node B 244, and UEs 238 and 240 can be in communication with Node B 246. Here, each Node B 242, 244, 246 is configured to provide an access point to a CN 104 (see FIG. 1) for all the UEs 230, 232, 234, 236, 238, 240 in the respective cells 202, 204, and 206.

As the UE 234 moves from the illustrated location in cell 204 into cell 206, a serving cell change (SCC) or handover may occur in which communication with the UE 234 transitions from the cell 204, which may be referred to as the source cell, to cell 206, which may be referred to as the target cell. Management of the handover procedure may take place at the UE 234, at the Node Bs corresponding to the respective cells, at a radio network controller 106 (see FIG. 1), or at another suitable node in the wireless network. For example, during a call with the source cell 204, or at any other time, the UE 234 may monitor various parameters of the source cell 204 as well as various parameters of neighboring cells such as cells 206 and 202. Further, depending on the quality of these parameters, the UE 234 may maintain communication with one or more of the neighboring cells. During this time, the UE 234 may maintain an Active Set, that is, a list of cells that the UE 234 is simultaneously connected to (i.e., the UTRA cells that are currently assigning a downlink dedicated physical channel DPCH or fractional downlink dedicated physical channel F-DPCH to the UE 234 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 3.

Figure 3:
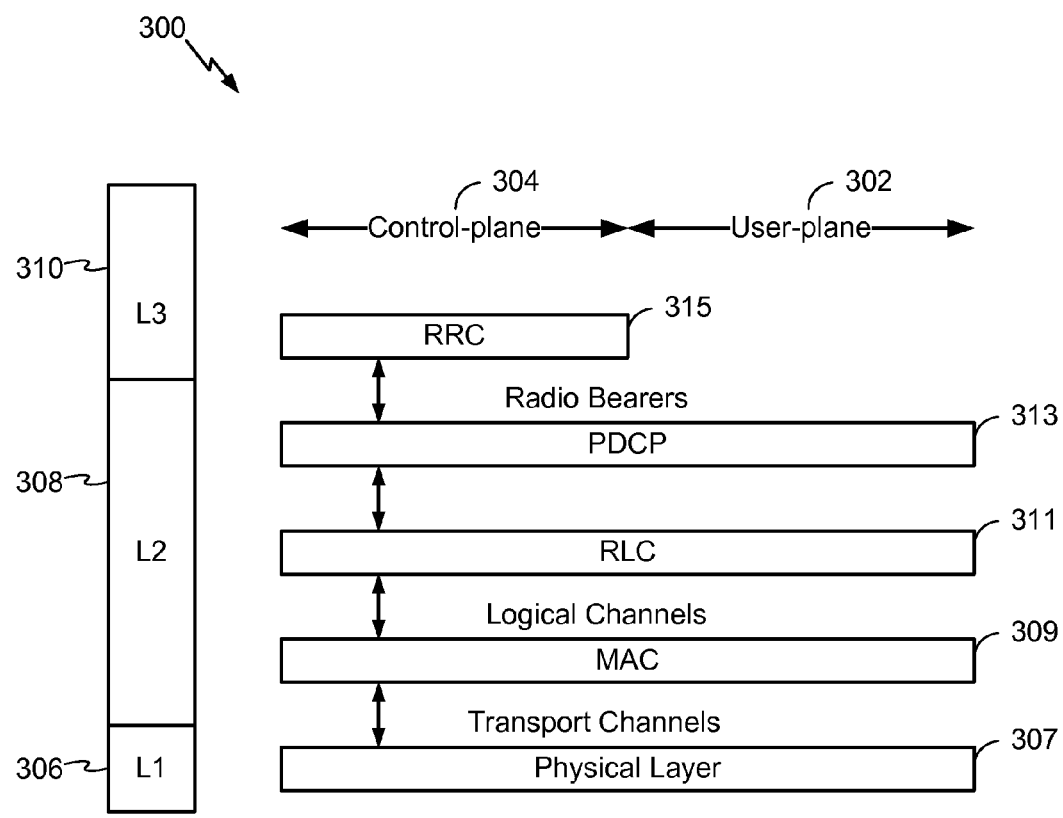
FIG. 3 is a conceptual diagram illustrating an example of a radio protocol architecture for the user and control plane.

Referring to FIG. 3 an example radio protocol architecture 400 relates to the user plane 302 and the control plane 304 of a user equipment (UE) or node B/base station. For example, architecture 300 may be included in a UE such as user equipment 110 (FIG. 1). The radio protocol architecture 300 for the UE and node B is shown with three layers: Layer 1 306, Layer 2 308, and Layer 3 310. Layer 1 306 is the lowest lower and implements various physical layer signal processing functions. As such, Layer 1 306 includes the physical layer 307. Layer 2 (L2 layer) 308 is above the physical layer 307 and is responsible for the link between the UE and node B over the physical layer 307. Layer 3 (L3 layer) 310 includes a radio resource control (RRC) sublayer 315. The RRC sublayer 315 handles the control plane signaling of Layer 3 between the UE and the UTRAN.

In the user plane, the L2 layer 308 includes a media access control (MAC) sublayer 309, a radio link control (RLC) sublayer 311, and a packet data convergence protocol (PDCP) 313 sublayer, which are terminated at the node B on the network side. Although not shown, the UE may have several upper layers above the L2 layer 308 including a network layer (e.g., IP layer) that is terminated at a PDN gateway on the network side, and an application layer that is terminated at the other end of the connection (e.g., far end UE, server, etc.).

The PDCP sublayer 313 provides multiplexing between different radio bearers and logical channels. The PDCP sublayer 313 also provides header compression for upper layer data packets to reduce radio transmission overhead, security by ciphering the data packets, and handover support for UEs between node Bs. The RLC sublayer 311 provides segmentation and reassembly of upper layer data packets, retransmission of lost data packets, and reordering of data packets to compensate for out-of-order reception due to hybrid automatic repeat request (HARQ). The MAC sublayer 309 provides multiplexing between logical and transport channels. The MAC sublayer 309 is also responsible for allocating the various radio resources (e.g., resource blocks) in one cell among the UEs. The MAC sublayer 309 is also responsible for HARQ operations.

Figure 4:
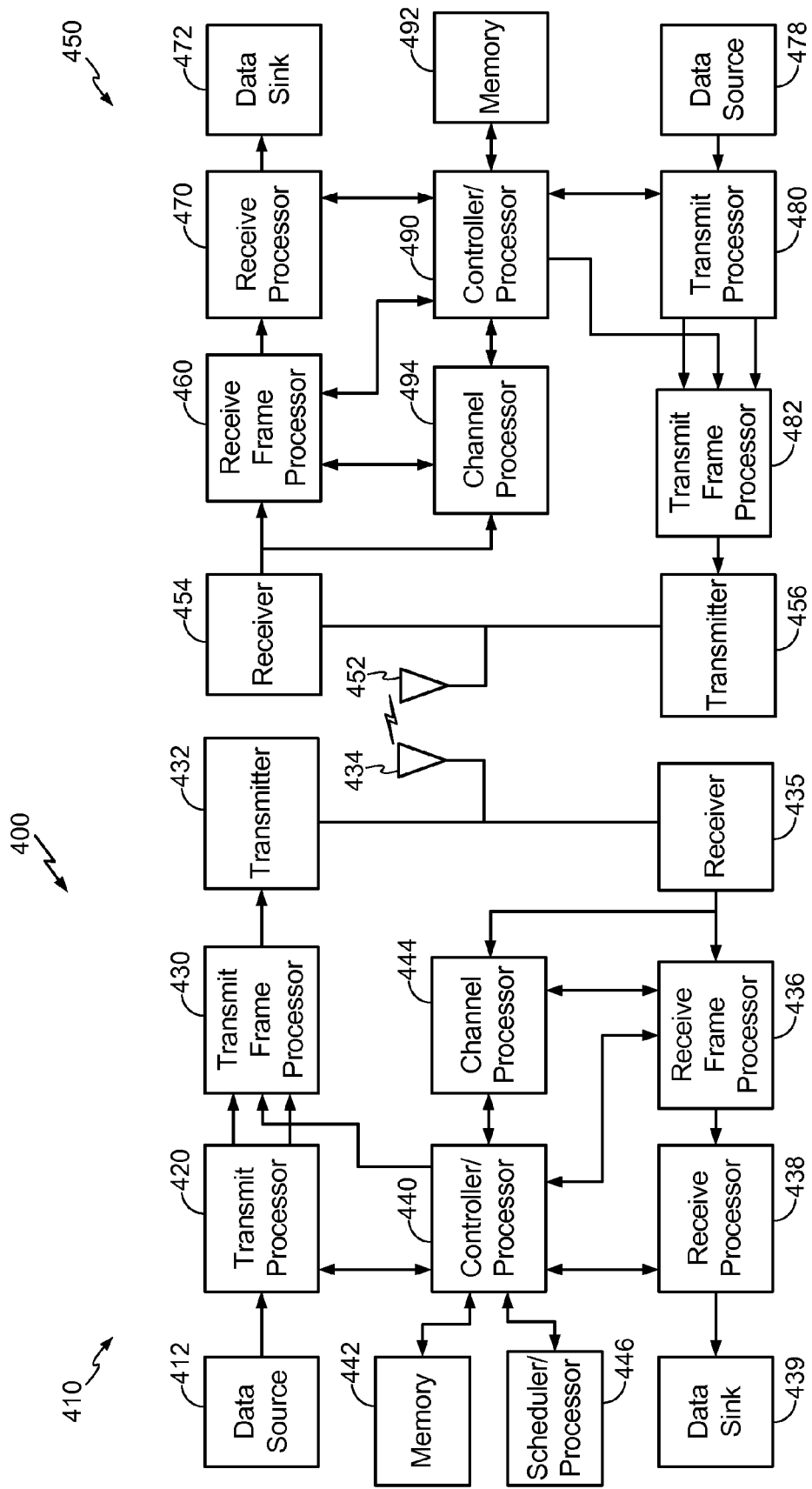
FIG. 4 is a block diagram conceptually illustrating an example of a Node B in communication with a UE in a telecommunications system.

FIG. 4 is a block diagram of a Node B 410 in communication with a UE 450, where the Node B 410 may be the Node B 108 in FIG. 1, and the UE 450 may be the UE 110 in FIG. 1. In the downlink communication, a transmit processor 420 may receive data from a data source 412 and control signals from a controller/processor 440. The transmit processor 420 provides various signal processing functions for the data and control signals, as well as reference signals (e.g., pilot signals). For example, the transmit processor 420 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 444 may be used by a controller/processor 440 to determine the coding, modulation, spreading, and/or scrambling schemes for the transmit processor 420. These channel estimates may be derived from a reference signal transmitted by the UE 450 or from feedback from the UE 450.

The symbols generated by the transmit processor 420 are provided to a transmit frame processor 430 to create a frame structure. The transmit frame processor 430 creates this frame structure by multiplexing the symbols with information from the controller/processor 440, resulting in a series of frames. The frames are then provided to a transmitter 432, which provides various signal conditioning functions including amplifying, filtering, and modulating the frames onto a carrier for downlink transmission over the wireless medium through antenna 434. The antenna 434 may include one or more antennas, for example, including beam steering bidirectional adaptive antenna arrays or other similar beam technologies.

At the UE 450, a receiver 454 receives the downlink transmission through an antenna 452 and processes the transmission to recover the information modulated onto the carrier. The information recovered by the receiver 454 is provided to a receive frame processor 460, which parses each frame, and provides information from the frames to a channel processor 494 and the data, control, and reference signals to a receive processor 470. The receive processor 470 then performs the inverse of the processing performed by the transmit processor 420 in the Node B 410. More specifically, the receive processor 470 descrambles and despreads the symbols, and then determines the most likely signal constellation points transmitted by the Node B 410 based on the modulation scheme. These soft decisions may be based on channel estimates computed by the channel processor 494. The soft decisions are then decoded and deinterleaved to recover the data, control, and reference signals. The CRC codes are then checked to determine whether the frames were successfully decoded. The data carried by the successfully decoded frames will then be provided to a data sink 472, which represents applications running in the UE 450 and/or various user interfaces (e.g., display). Control signals carried by successfully decoded frames will be provided to a controller/processor 490. When frames are unsuccessfully decoded by the receiver processor 470, the controller/processor 490 may also use an acknowledgement (ACK) and/or negative acknowledgement (NACK) protocol to support retransmission requests for those frames.

In the uplink, data from a data source 478 and control signals from the controller/processor 490 are provided to a transmit processor 480. The data source 478 may represent applications running in the UE 450 and various user interfaces (e.g., keyboard). Similar to the functionality described in connection with the downlink transmission by the Node B 410, the transmit processor 480 provides various signal processing functions including CRC codes, coding and interleaving to facilitate FEC, mapping to signal constellations, spreading with OVSFs, and scrambling to produce a series of symbols. Channel estimates, derived by the channel processor 494 from a reference signal transmitted by the Node B 410 or from feedback contained in the midamble transmitted by the Node B 410, may be used to select the appropriate coding, modulation, spreading, and/or scrambling schemes. The symbols produced by the transmit processor 480 will be provided to a transmit frame processor 482 to create a frame structure. The transmit frame processor 482 creates this frame structure by multiplexing the symbols with information from the controller/processor 490, resulting in a series of frames. The frames are then provided to a transmitter 456, which provides various signal conditioning functions including amplification, filtering, and modulating the frames onto a carrier for uplink transmission over the wireless medium through the antenna 452.

The uplink transmission is processed at the Node B 410 in a manner similar to that described in connection with the receiver function at the UE 450. A receiver 435 receives the uplink transmission through the antenna 434 and processes the transmission to recover the information modulated onto the carrier. The information recovered by the receiver 435 is provided to a receive frame processor 436, which parses each frame, and provides information from the frames to the channel processor 444 and the data, control, and reference signals to a receive processor 438. The receive processor 438 performs the inverse of the processing performed by the transmit processor 480 in the UE 450. The data and control signals carried by the successfully decoded frames may then be provided to a data sink 439 and the controller/processor, respectively. If some of the frames were unsuccessfully decoded by the receive processor, the controller/processor 440 may also use an acknowledgement (ACK) and/or negative acknowledgement (NACK) protocol to support retransmission requests for those frames.

The controller/processors 440 and 490 may be used to direct the operation at the Node B 410 and the UE 450, respectively. For example, the controller/processors 440 and 490 may provide various functions including timing, peripheral interfaces, voltage regulation, power management, and other control functions. The computer readable media of memories 442 and 492 may store data and software for the Node B 410 and the UE 450, respectively. A scheduler/processor 446 at the Node B 410 may be used to allocate resources to the UEs and schedule downlink and/or uplink transmissions for the UEs.

In one configuration, the apparatus 450 for wireless communication includes means for obtaining one or more channel impulse response (CIR) estimates, means for generating a delay spread metric value that characterizes a multipath delay spread of a channel based on the obtained one or more CIR estimates, and means for selecting a receiver for use by the UE from a plurality receiver options based on the generated delay spread metric value. In one aspect, the aforementioned means may be the processor(s) 460, 470, 490, and/or 494 configured to perform the functions recited by the aforementioned means. In another aspect, the aforementioned means may be a module or any apparatus configured to perform the functions recited by the aforementioned means.

Figure 5:
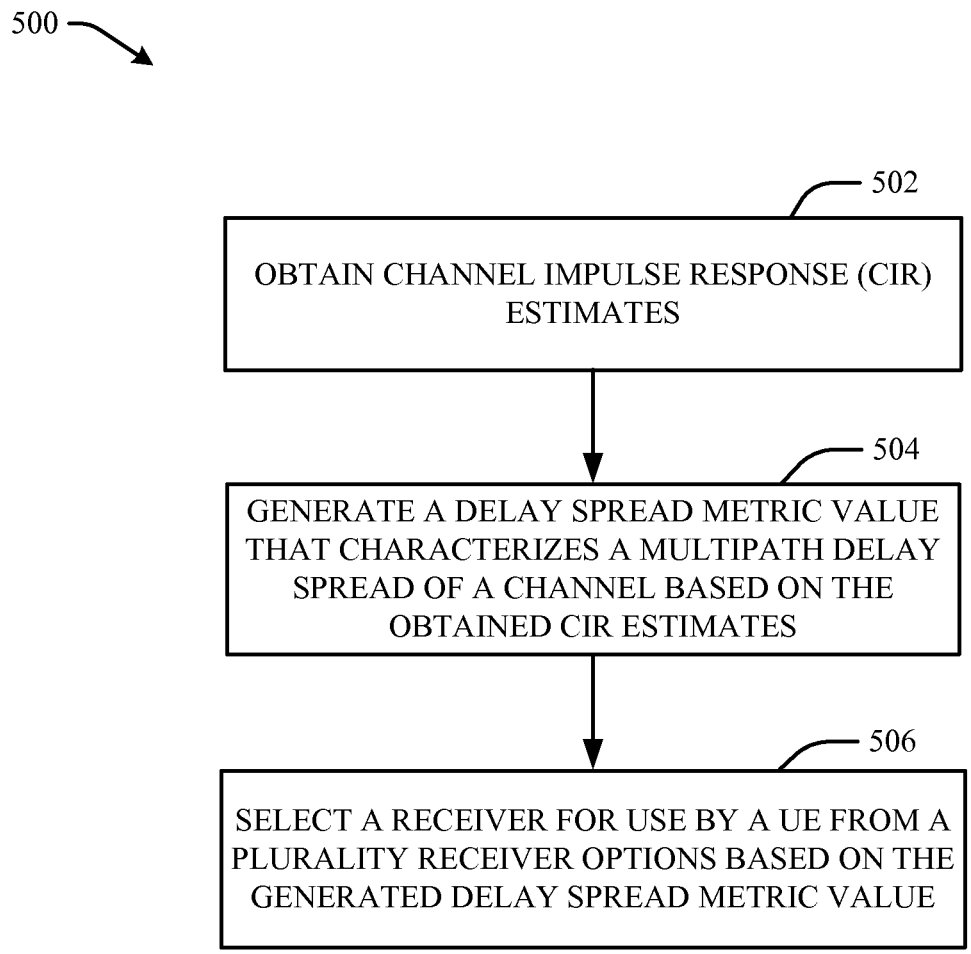
FIG. 5 is flowchart illustrating an example process for dynamically selecting a UE receiver based on channel impulse response estimates, according to an aspect.

FIG. 5 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
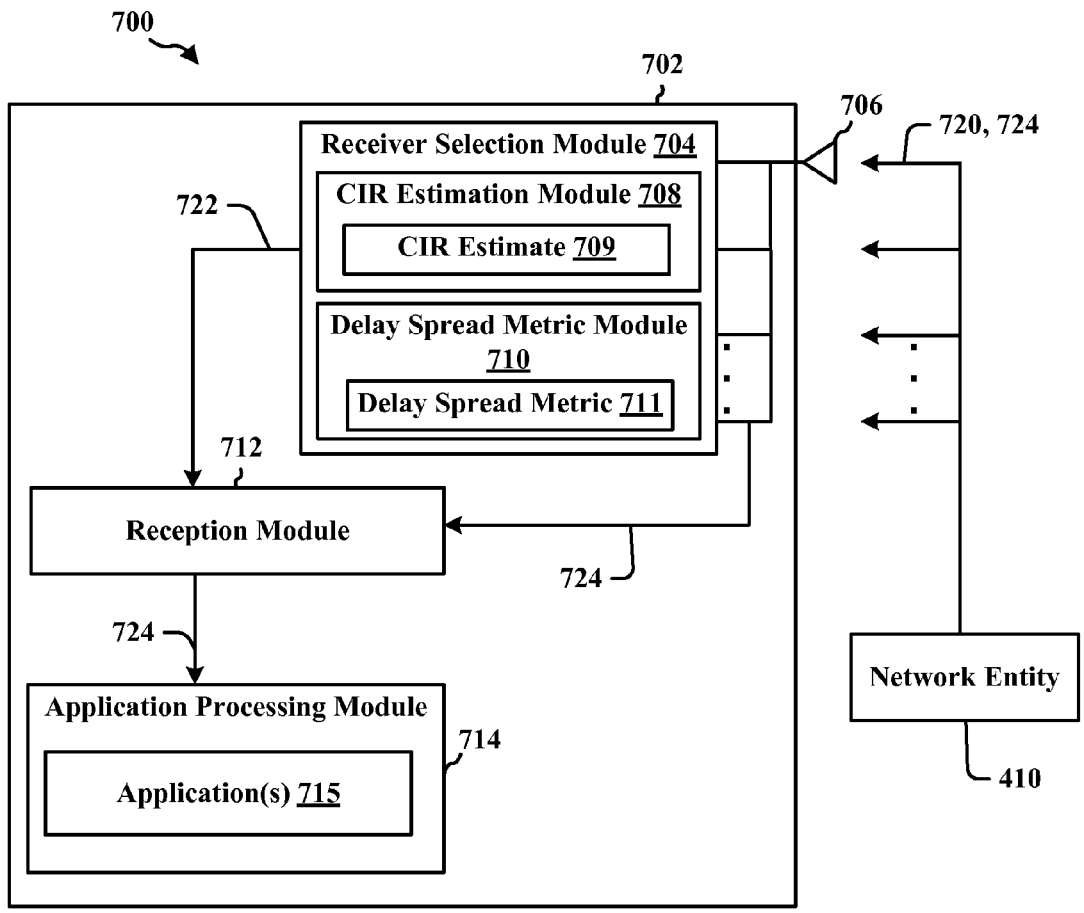
FIG. 7 is a conceptual data flow diagram illustrating the data flow between different modules/means/components in an exemplary apparatus.

With reference now to FIG. 5, an example flowchart describing dynamic selection a UE receiver based on channel impulse response estimates. The methodology depicted in FIG. 5 is described with reference to the apparatus 702 depicted in FIG. 7. FIG. 7 is discussed in further detail later in the application. Further, although the methodology associated with the FIG. 5 is described as being implemented by the apparatus depicted in FIG. 7, the methodology may be also be implemented by any such apparatus, e.g., UE 110, UEs 230-240, UE 450, communications device 600, apparatus 702', etc.).

At block 502, a UE may obtain one or more channel impulse response (CIR) estimates. In an aspect, a receiver selection module 704 associated with the UE 702 may include a CIR estimation module 708 which may be configured to estimate the CIR 709 from a signal 720 received via antenna 706. CIR estimates 709 may be generated at the UE for purposes, such as but not limited to, demodulating received signal. In an aspect, CIR estimates 709 may be computed from the pilot channel (available in all major air interface technologies such as WCMDA, LTE, and 1x), iteratively from data channel(s), or a combination thereof.

At block 504, the UE may generate a delay spread metric value that characterizes a multipath delay spread of a channel based on the obtained one or more CIR estimates. In an aspect, the receiver selection module 704, associated with the UE 702, may include a delay spread metric module 710 may be configured generate a delay spread metric value 711. In an aspect, the delay spread metric value may be refreshed periodically to track temporal evolution of the wireless channel. In another aspect, a filter may be used to smooth out any estimation errors. In such an aspect, a one-pole IIR filter may be used. In an aspect, the delay spread metric value may be a scalar. Additionally or in the alternative, the delay spread metric value may be a vector. In another aspect, the delay spread metric value may be generated by determining a center of weight for one or more vectors representing a CIR tap vector, computing a distance vector from the center of weight for each tap value in the CIR tap vector, and generating the delay spread metric value based on the distance vector and the CIR tap vector.

At block 506, the UE may select a receiver option, with a first power consumption value, from a plurality of receiver options with different optimal power consumption values, based on the generated delay spread metric value. In an aspect, the receiver selection module 704, associated with the UE 702, maybe configured to make a receiver selection 722 based on the delay spread metric value 711. In an aspect, the UE may be equipped with "K" receiver options, where K>1. For example, receiver options could include a RAKE receiver, a linear equalizer, a decision feedback equalizer (DFE), an interference canceller, etc. In another example, the available receiver options could be linear equalizers with different spans (e.g., different number of filter taps). In still another aspect, a HSDPA capable modem may include a RAKE receiver, linear equalizer, and an interference cancellation and equalizer receiver option. In an aspect, prior to selection of a receiver option, the receiver options may be ordered in increasing order of performance (e.g., receiver k+1 performs better than receiver k (k=1, . . . , K−1)). In an aspect, a measure of performance by which to order the receiver options may be the signal-to-noise ratio (SNR) at the output of the receiver. Generally, a receiver option with comparatively better performance may also consume more power (e.g., receiver k+1 may consume more power than receiver k (k=1, . . . , K−1)). Thereafter, the UE may select one of the K receiver options based on comparison of the metric D (e.g., a delay spread metric) to a set of fixed thresholds, such as provided in Equation (1).

$$\text{Receiver} = \begin{cases} 1 & \text{if } D \leq D_1 \\ 2 & \text{if } D_1 < D \leq D_2 \\ \vdots \\ K & \text{if } D_{K-1} < D \end{cases} \quad (1)$$

In an aspect, the comparison thresholds may be determined by a modem designer. As seen in equation (1), receiver k would be selected if the metric D satisfies $D_{k-1} < D \leq D_k$. In an aspect, a channel may be considered rich in multipath where the delay spread metric value is above a threshold value (e.g., $D \geq 3$). In another aspect, a channel may be considered exhibiting flat fading where the delay spread metric value is below a threshold value (e.g., $D \leq 3$). In another aspect, hysteresis may be introduced as part of the design to attempt to prevent frequent switching between receivers. For example, once the UE switches to receiver k, the UE may be prompted to stay with the selection for at least $N_k$ time-slots before re-evaluating the decision. Additionally, or in the alternative, further constraints may be imposed to allow for smoother transitions, (e.g. if the UE is currently using receiver k, then a subsequent receiver option may be limited to receiver k−1 or receiver k+1).

Accordingly, a system is presented in which a wireless device, even though it may be capable of using sophisticated signal processing algorithms, can select to dynamically enable/disable these algorithms to save power opportunistically. In such an aspect, the UE 702 receive a signal 724 from a network entity 410 using the selected receiver 722 associated with reception module 712. Further, the signal 724 may be processed through reception module 712 and provided to an application 715 served by an application processing module 714. Specifically, through use of this process, the modem may be configured to take advantage of channel impulse response estimates (which may be estimated for modem operation for other purposes) to dynamically enable/disable advanced receiver algorithms such as equalizers and interference cancellers.

Figure 6:
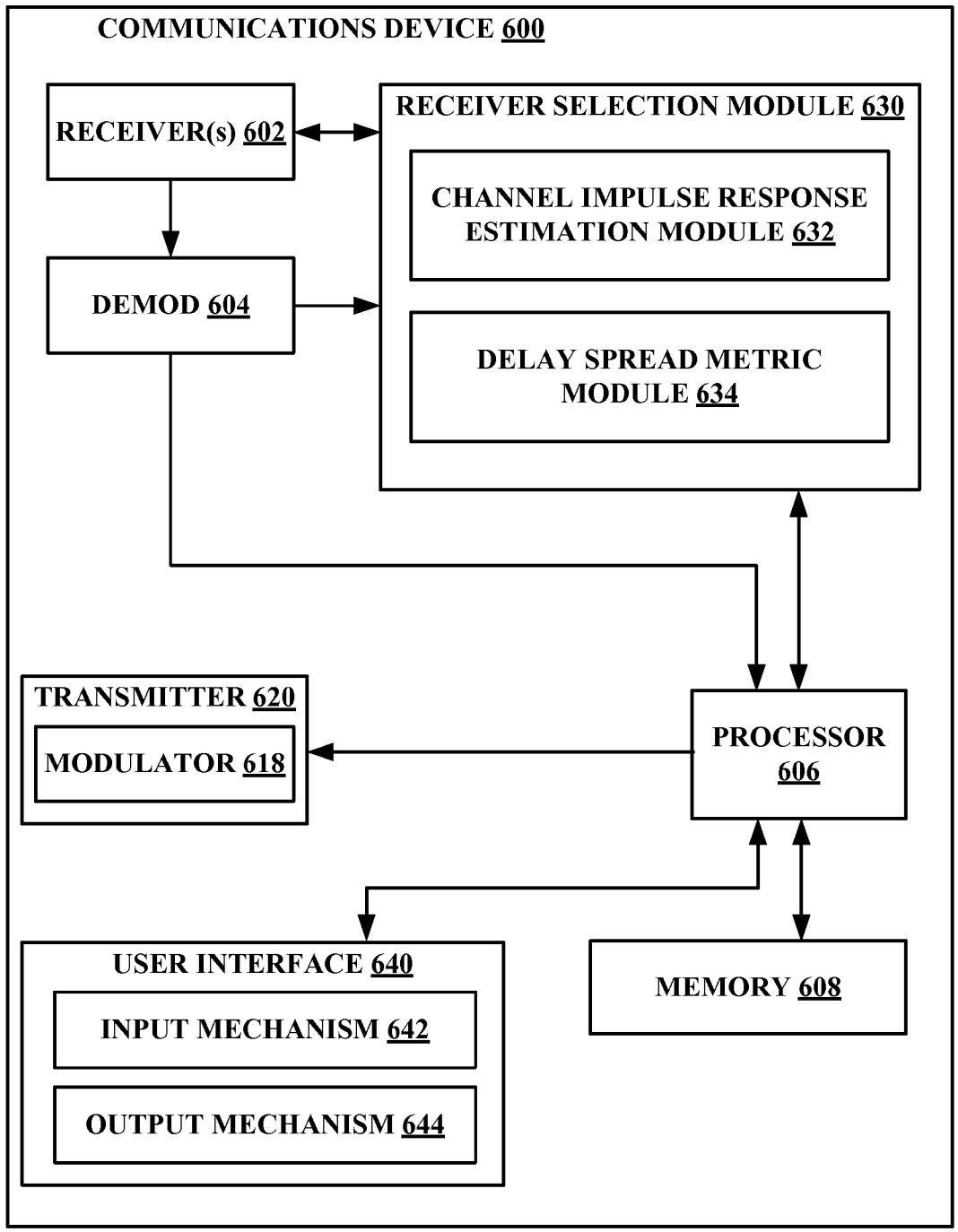
FIG. 6 is a functional block diagram example architecture of a communications device configured to dynamically select a receiver based on a channel impulse response estimate, according to an aspect.

FIG. 6 illustrates an example architecture of communications device 600. In an aspect, the communications device 600 may be an example implementation of a UE, such as discussed in FIGS. 1, 2, and 4. As depicted in FIG. 6, communications device 600 includes receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can include a demodulator 604 that can demodulate received symbols and provide them to processor 606 for channel estimation. Processor 606 can be a processor dedicated to analyzing information received by receiver 602 and/or generating information for transmission by transmitter 620, a processor that controls one or more components of communications device 600, and/or a processor that both analyzes information received by receiver 602, generates information for transmission by transmitter 620, and controls one or more components of communications device 600. Further, signals may be prepared for transmission by transmitter 620 through modulator 618 which may modulate the signals processed by processor 606.

Communications device 600 can additionally include memory 608 that is operatively coupled to processor 606 and that can store data to be transmitted, received data, information related to available channels, TCP flows, data associated with analyzed signal and/or interference strength, information related to an assigned channel, power, rate, or the like, and any other suitable information for estimating a channel and communicating via the channel. Communications device 600 can additionally include a power supply (e.g., battery, power supply interface, etc.).

Further, at least one of processor 606 or receiver selection module 630 can provide means for obtaining one or more channel impulse response (CIR) estimates, means for generating a delay spread metric value that characterizes a multipath delay spread of a channel based on the obtained one or more CIR estimates, and means for selecting a receiver option with a first power consumption value, for use by the UE, from a plurality receiver options with different optimal power consumption values, based on the generated delay spread metric value.

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 608 of the subject systems and methods may comprise, without being limited to, these and any other suitable types of memory.

Communications device 600 may include receiver selection module 630. Receiver selection module 630 may include channel impulse response (CIR) estimation module 632 and delay spread metric module 634. In an aspect, CIR estimation module 632 may be configured to obtain CIR estimates that may be generated as part of communications device 600. For example, CIR estimates may be generated at the communications device for purposes, such as but not limited to, demodulating a signal using demodulator 604. In another aspect, CIR estimation module 632 may compute CIR estimates from the pilot channel (available in all major air interface technologies such as WCMDA, LTE, and 1x), iteratively from data channel(s), or a combination thereof. In an aspect, delay spread metric module 634 may be configured to generate a delay spread metric value based on the CIR estimates. In an aspect, the delay spread metric value may be refreshed periodically to track temporal evolution of the wireless channel. In another aspect, a filter may be used to smooth out any estimation errors. In such an aspect, a one-pole IIR filter may be used. In an aspect, the delay spread metric value may be a scalar. Additionally or in the alternative, the delay spread metric value may be a vector. In another aspect, an algorithm may be used to generate the delay spread metric value. By way of example and not limitation, a vector "h" may be used to denote a channel impulse response tap vector with M taps, and $h_m$ denotes the "$m^{th}$" element of vector h (m=0, 1, . . . , M-1). Assuming that M is an even number, a weighting vector "r" can be defined with M length such that $r_0=0$, $r_1=-M/2+1$, $r_2=-M/2+2$, . . . , $r_{M/2}=0$, . . . , $r_{M-1}=M/2-1$. In such an aspect, delay spread metric module 634 may generate the delay spread metric value "D" using equations (2), (3), and (4).

$$\text{Center of weight (CoW)} = \Sigma_{m=0}^{M-1} r_m |h_m|^2 \quad (2)$$

$$\text{Distance from CoW (d)} = |r - CoW| \quad (3)$$

$$\text{Delay spread metric (D)} = \Sigma_{m=0}^{M-1} d_m |h_m|^2 \quad (4)$$

Delay spread metric module 634 may calculate a center of weight (equation (2)), then compute a distance from the center of weight (equation (3)), and using the distance may compute the delay spread metric (equation (4)). In such an aspect, the total energy in the CIR vector may be normalized to 1 prior to the computation of D using equations (2), (3), and (4). In another aspect, in vector "r" instead of setting just $r_{M/2}$ to 0, J elements around the middle tap could be set to 0 ($r_{M/2-J/2}=r_{M/2-J/2+1}, \ldots, =r_{M/2+J/2}=0$). In still another aspect, the definition of "distance from CoW" (d) may be modified to $d=\|r-CoW\|^2$. Further description of various processes performed by receiver selection module 630 is provided above with reference to FIG. 5.

Additionally, communications device 600 may include user interface 640. User interface 640 may include input mechanisms 642 for generating inputs into communications device 600, and output mechanism 644 for generating information for consumption by the user of the communications device 600. For example, input mechanism 642 may include a mechanism such as a key or keyboard, a mouse, a touchscreen display, a microphone, etc. Further, for example, output mechanism 644 may include a display, an audio speaker, a haptic feedback mechanism, etc. In the illustrated aspects, the output mechanism 644 may include a display configured to present media content that is in image or video format or an audio speaker to present media content that is in an audio format.

FIG. 7 is a conceptual data flow diagram 700 illustrating the data flow between different modules/means/components in an example apparatus 702. The apparatus may be a wireless device (e.g., UE 110, UE 230-240, UE 450, etc.). As noted above with respect to the flowchart describe in FIG. 5, the apparatus 702 may include a receiver selection module 704 associated with one or more antennas 706 and including a CIR estimation module 708 and a delay spread metric module 710, a reception module 712, and an application processing module 714 supporting one or more applications 715.

The apparatus may include additional modules that perform each of the steps of the algorithm in the aforementioned flow chart of FIG. 5. As such, each step in the aforementioned FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 8:
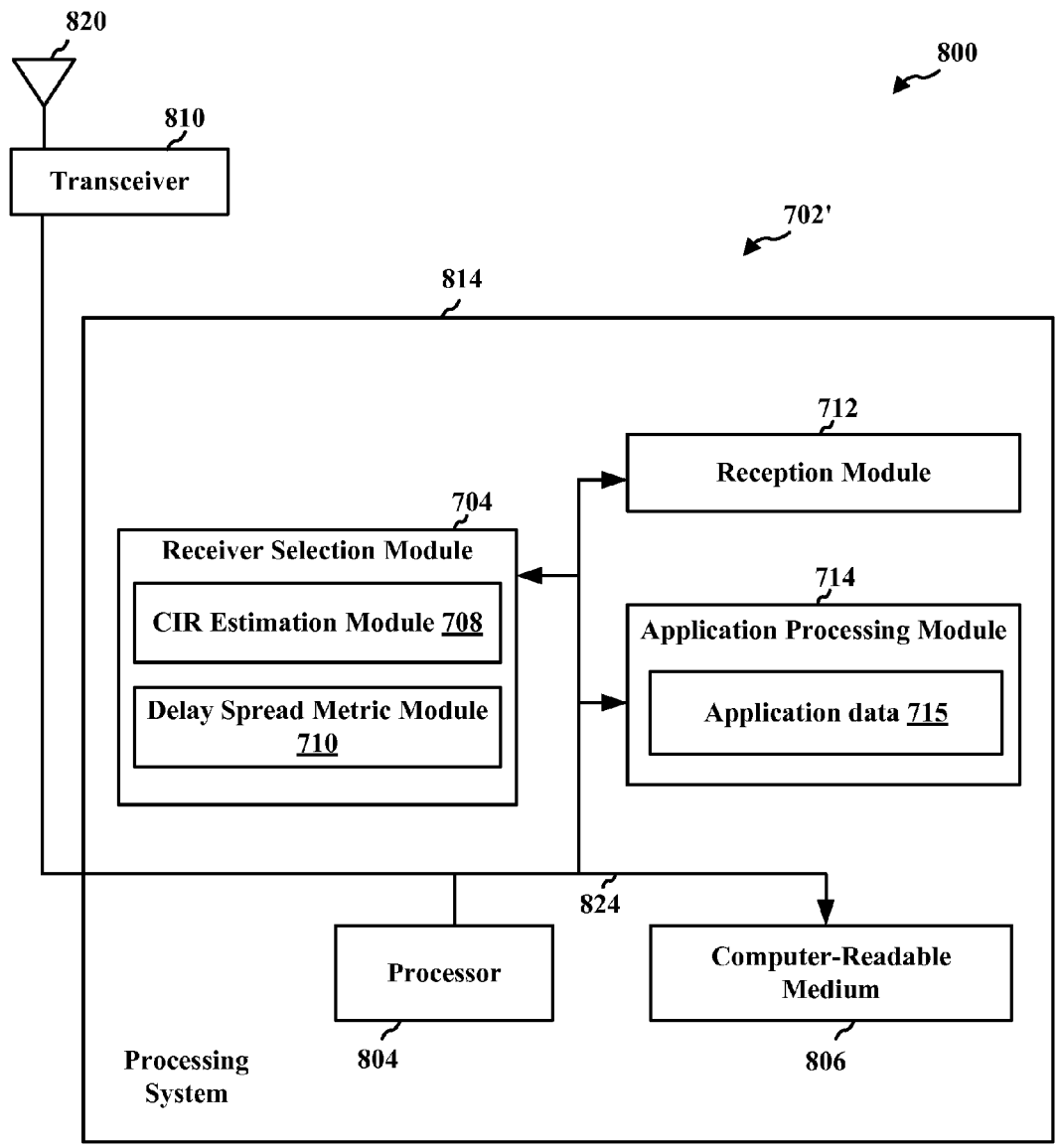
FIG. 8 is a diagram illustrating an example of a hardware implementation for an apparatus employing a processing system.

FIG. 8 is a diagram 800 illustrating an example of a hardware implementation for an apparatus 702' employing a processing system 814. In an aspect, the apparatus 702' may be an additional/alternative implementation of apparatus 702. As such, apparatus 702' may also perform each of the steps of the algorithm in the aforementioned flow chart of FIG. 5. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware modules, represented by the processor 804, the modules 704, 708, 710, 712, 714, and the computer-readable medium 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to two or more antennas 820. The transceiver 810 provides a means for communicating with various other apparatus over a transmission medium. The processing system 814 includes a processor 804 coupled to a computer-readable medium 806. The processor 804 is responsible for general processing, including the execution of software stored on the computer-readable medium 806. The software, when executed by the processor 804, causes the processing system 814 to perform the various functions described supra for any particular apparatus. The computer-readable medium 806 may also be used for storing data that is manipulated by the processor 804 when executing software. The processing system further includes at least one of the modules 704, 708, 710, 712, and 714. The modules may be software modules running in the processor 804, resident/stored in the computer-readable medium 806, one or more hardware modules coupled to the processor 804, or some combination thereof. In an aspect, the processing system 814 may be a component of the UE 450 and may include the memory 492 and/or at least one of the receiver 454, the TX processor 480, the RX processor 470, and the controller/processor 490.

In a configuration, the apparatus 702/702' for wireless communication includes means for obtaining, by a UE, one or more CIR estimates, means for generating a delay spread metric value that characterizes a multipath delay spread of a channel based on the obtained one or more CIR estimates, and means for selecting a receiver option with a first power consumption value, for use by the UE, from a plurality receiver options with different optimal power consumption values, based on the generated delay spread metric value. In an aspect, apparatus 702/702' means for obtaining may be further configured to receive at least one of a pilot channel signal or one or more data channel signals from a network entity, and compute the CIR estimates based on the received at least one signal. In an aspect, apparatus 702/702' means for obtaining may be further configured to compute the CIR estimates as part of a signal demodulation process. In an aspect, apparatus 702/702' means for generating may be further configured to determine a center of weight for one or more vectors representing a CIR tap vector, compute a distance vector from the center of weight for each tap value in the CIR tap vector, and generate the delay spread metric value based on the distance vector and the CIR tap vector. In an aspect, apparatus 702/702' means for generating may be further configured to apply an error filter to the generated delay spread metric to reduce estimation errors. In an aspect, apparatus 702/702' means for selecting may be further configured to select a comparatively more complex receiver option when the delay spread metric value indicates that the channel is rich in multipath. In an aspect, the first power consumption value may correspond to a receiver option of the plurality of receiver options with a comparatively greater power consumption. In an aspect, apparatus 702/702' means for selecting may be further configured to select a comparatively less complex receiver option when the delay spread metric value indicates that the channel exhibits flat fading. In an aspect, the first power consumption value may correspond to a receiver option of the plurality of receiver options with a comparatively smaller power consumption.

As described supra, the processing system 814 may include the receiver 454, the TX processor 480, the RX processor 470, and the controller/processor 490. As such, in one configuration, the aforementioned means may be the receiver 454, the TX processor 480, the RX processor 470, and the controller/processor 490 configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of communications, comprising:
   obtaining, by a user equipment (UE), one or more channel impulse response (CIR) estimates;
   generating a delay spread metric value that characterizes a multipath delay spread of a channel based on the obtained one or more (CIR) estimates;
   ordering a plurality of receiver options with different optimal power consumption values in increasing order of performance that is based on a signal-to-noise ratio (SNR) at an output of a receiver;
   selecting a receiver option with a first power consumption value, for use by the UE, from the plurality of receiver options based on a comparison of the generated delay spread metric value with a set of thresholds related to the plurality of receiver options; and
   maintaining the UE at the selected receiver option for a number of time slots prior to determining whether to select a different receiver option from a first set of receiver options based on a comparison of the delay spread metric value with a set of thresholds related to the first set of receiver options, wherein the first set of receiver options is limited to receiver options from the plurality of receiver options that are adjacent to the selected receiver option within the order of performance.

2. The method of claim 1, wherein the obtaining further comprises:
   receiving at least one of a pilot channel signal or one or more data channel signals from a network entity; and
   computing the CIR estimates based on the received at least one signal.

3. The method of claim 1, wherein the obtaining further comprises computing the CIR estimates as part of a signal demodulation process.

4. The method of claim 1, wherein the generating further comprises:
   determining a center of weight for one or more vectors representing a CIR tap vector;
   computing a distance vector from the center of weight for each tap value in the CIR tap vector; and
   generating the delay spread metric value based on the distance vector and the CIR tap vector.

5. The method of claim 1, wherein the generating further comprises generating the delay spread metric value periodically.

6. The method of claim 1, wherein the generating further comprises applying an error filter to the generated delay spread metric value to reduce estimation errors.

7. The method of claim 1, wherein the selecting further comprises selecting a comparatively more complex receiver option when the delay spread metric value indicates that the channel is rich in multipath, and wherein the first power consumption value corresponds to the receiver option of the plurality of receiver options with a comparatively greater power consumption.

8. The method of claim 1, wherein the selecting further comprises selecting a comparatively less complex receiver option when the delay spread metric value indicates that the channel exhibits flat fading, and wherein the first power consumption value corresponds to the receiver option of the plurality of receiver options with a comparatively smaller power consumption.

9. The method of claim 1, wherein the plurality of receiver options comprises at least two receivers of a RAKE receiver, a linear equalizer, a decision feedback equalizer (DFE), or interference canceller.

10. The method of claim 1, wherein the plurality of receiver options comprises a linear equalizer with multiple different available spans.

11. An apparatus for communication, comprising:
    means for obtaining, by a user equipment (UE), one or more channel impulse response (CIR) estimates;
    means for generating a delay spread metric value that characterizes a multipath delay spread of a channel based on the obtained one or more CIR estimates;
    means for ordering a plurality of receiver options with different optimal power consumption values in increasing order of performance that is based on a signal-to-noise ratio (SNR) at an output of a receiver;
    means for selecting a receiver option with a first power consumption value, for use by the UE, from the plurality of receiver options based on a comparison of the generated delay spread metric value with a set of thresholds related to the plurality of receiver options; and
    means for maintaining the UE at the selected receiver option for a number of time slots prior to determining whether to select a different receiver option from a first set of receiver options based on a comparison of the delay spread metric value with a set of thresholds related to the first set of receiver options, wherein the first set of receiver options is limited to receiver options from the plurality of receiver options that are adjacent to the selected receiver option within the order of performance.

12. The apparatus of claim 11, wherein the means for obtaining further comprises:
    means for receiving at least one of a pilot channel signal or one or more data channel signals from a network entity; and
    means for computing the CIR estimates based on the received at least one signal.

13. The apparatus of claim 11, wherein the means for obtaining further comprises means for computing the CIR estimates as part of a signal demodulation process.

14. The apparatus of claim 11, wherein the means for generating are further configured to:
    determine a center of weight for one or more vectors representing a CIR tap vector;
    compute a distance vector from the center of weight for each tap value in the CIR tap vector; and
    generate the delay spread metric value based on the distance vector and the CIR tap vector.

15. The apparatus of claim 11, wherein the means for generating are further configured to generate the delay spread metric value periodically.

16. The apparatus of claim 11, wherein the means for generating are further configured to apply an error filter to the generated delay spread metric value to reduce estimation errors.

17. The apparatus of claim 11, wherein the means for selecting are further configured to select a comparatively more complex receiver option when the delay spread metric value indicates that the channel is rich in multipath, and wherein the first power consumption value corresponds to the receiver option of the plurality of receiver options with a comparatively greater power consumption.

18. The apparatus of claim 11, wherein the means for selecting are further configured to select a comparatively less complex receiver option when the delay spread metric value indicates that the channel exhibits flat fading, and wherein the first power consumption value corresponds to the receiver option of the plurality of receiver options with a comparatively smaller power consumption.

19. The apparatus of claim 11, wherein the plurality of receiver options comprises at least two receivers of a RAKE receiver, a linear equalizer, a decision feedback equalizer (DFE), or interference canceller.

20. The apparatus of claim 11, wherein the plurality of receiver options comprises a linear equalizer with multiple different available spans.

21. A non-transitory computer-readable medium comprising code for:
    obtaining, by a user equipment (UE), one or more channel impulse response (CIR) estimates;
    generating a delay spread metric value that characterizes a multipath delay spread of a channel based on the obtained one or more CIR estimates;
    ordering a plurality of receiver options with different optimal power consumption values in increasing order of performance that is based on a signal-to-noise ratio (SNR) at an output of a receiver;
    selecting a receiver option with a first power consumption value, for use by the UE, from the plurality of receiver options based on a comparison of the generated delay spread metric value with a set of thresholds related to the plurality of receiver options; and
    maintaining the UE at the selected receiver option for a number of time slots prior to determining whether to select a different receiver option from a first set of receiver options based on a comparison of the delay spread metric value with a set of thresholds related to the first set of receiver options, wherein the first set of receiver options is limited to receiver options from the plurality of receiver options that are adjacent to the selected receiver option within the order of performance.

22. The non-transitory computer-readable medium of claim 21, further comprising code for:
    receiving at least one of a pilot channel signal or one or more data channel signals from a network entity; and
    computing the CIR estimates based on the received at least one signal.

23. The non-transitory computer-readable medium of claim 21, further comprising code for computing the CIR estimates as part of a signal demodulation process.

24. The non-transitory computer-readable medium of claim 21, further comprising code for:
    determining a center of weight for one or more vectors representing a CIR tap vector;
    computing a distance vector from the center of weight for each tap value in the CIR tap vector; and
    generating the delay spread metric value based on the distance vector and the CIR tap vector.

25. The non-transitory computer-readable medium of claim 21, further comprising code for generating the delay spread metric value periodically.

26. The non-transitory computer-readable medium of claim 21, further comprising code for applying an error filter to the generated delay spread metric value to reduce estimation errors.

27. The non-transitory computer-readable medium of claim 21, further comprising code for selecting a comparatively more complex receiver option when the delay spread metric value indicates that the channel is rich in multipath, and wherein the first power consumption value corresponds to the receiver option of the plurality of receiver options with a comparatively greater power consumption.

28. The non-transitory computer-readable medium of claim 21, further comprising code for selecting a comparatively more complex receiver option when the delay spread metric value indicates that the channel exhibits flat fading, and wherein the first power consumption value corresponds to the receiver option of the plurality of receiver options with a comparatively smaller power consumption.

29. The non-transitory computer-readable medium of claim 21, wherein the plurality of receiver options comprises at least two receivers of a RAKE receiver, a linear equalizer, a decision feedback equalizer (DFE), or interference canceller.

30. The non-transitory computer-readable medium of claim 21, wherein the plurality of receiver options comprises a linear equalizer with multiple different available spans.

31. An apparatus for wireless communication, comprising:
    a plurality of receiver options;
    at least one processor; and
    a memory coupled to the at least one processor, wherein the at least one processor is configured to:
        obtain one or more channel impulse response (CIR) estimates;
        generate a delay spread metric value that characterizes a multipath delay spread of a channel based on the obtained one or more CIR estimates;
        order the plurality of receiver options with different optimal power consumption values in increasing order of performance that is based on a signal-to-noise ratio (SNR) at an output of a receiver;
select a receiver option with a first power consumption value, for use by the UE, from the plurality of receiver options based on a comparison of the generated delay spread metric value with a set of thresholds related to the plurality of receiver options; and
maintain the UE at the selected receiver option for a number of time slots prior to determining whether to select a different receiver option from a first set of receiver options based on a comparison of the delay spread metric value with a set of thresholds related to the first set of receiver options, wherein the first set of receiver options is limited to receiver options from the plurality of receiver options that are adjacent to the selected receiver option within the order of performance.

32. The apparatus of claim 31, wherein the at least one processor is further configured to:
receive at least one of a pilot channel signal or one or more data channel signals from a network entity; and
compute the CIR estimates based on the received at least one signal.

33. The apparatus of claim 31, wherein the at least one processor is further configured to compute the CIR estimates as part of a signal demodulation process.

34. The apparatus of claim 31, wherein the at least one processor is further configured to:
determine a center of weight for one or more vectors representing a CIR tap vector;
compute a distance vector from the center of weight for each tap value in the CIR tap vector; and
generate the delay spread metric value based on the distance vector and the CIR tap vector.

35. The apparatus of claim 31, wherein the at least one processor is further configured to generate the delay spread metric value periodically.

36. The apparatus of claim 31, wherein the at least one processor is further configured to apply an error filter to the generated delay spread metric value to reduce estimation errors.

37. The apparatus of claim 31, wherein the at least one processor is further configured to select a comparatively more complex receiver option when the delay spread metric value indicates that the channel is rich in multipath, and wherein the first power consumption value corresponds to the receiver option of the plurality of receiver options with a comparatively greater power consumption.

38. The apparatus of claim 31, wherein the at least one processor is further configured to select a comparatively more complex receiver option when the delay spread metric value indicates that the channel exhibits flat fading, and wherein the first power consumption value corresponds to the receiver option of the plurality of receiver options with a comparatively smaller power consumption.

39. The apparatus of claim 31, wherein the plurality of receiver options comprises at least two receivers of a RAKE receiver, a linear equalizer, a decision feedback equalizer (DFE), or interference canceller.

40. The apparatus of claim 31, wherein the plurality of receiver options comprises a linear equalizer with multiple different available spans.

41. The method of claim 1, wherein the set of thresholds includes a first threshold and a second threshold, and wherein a first receiver option of the plurality of receiver options is selected if the generated delay spread metric value is greater than the first threshold and less than or equal to the second threshold.

42. The apparatus of claim 31, wherein the set of thresholds includes a first threshold and a second threshold, and wherein a first receiver option of the plurality of receiver options is selected if the generated delay spread metric value is greater than the first threshold and less than or equal to the second threshold.

* * * * *